US010422704B2

(12) United States Patent
Bonifas et al.

(10) Patent No.: US 10,422,704 B2
(45) Date of Patent: Sep. 24, 2019

(54) MAGNETIC BASED TEMPERATURE SENSING FOR ELECTRICAL TRANSMISSION LINE

(71) Applicant: 3M INNOVATIVE PROPERTIES COMPANY, St. Paul, MN (US)

(72) Inventors: Andrew P. Bonifas, Alberta (CA); Ronald D. Jesme, Plymouth, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 88 days.

(21) Appl. No.: 15/523,590

(22) PCT Filed: Nov. 5, 2015

(86) PCT No.: PCT/US2015/059260
§ 371 (c)(1),
(2) Date: May 1, 2017

(87) PCT Pub. No.: WO2016/089541
PCT Pub. Date: Jun. 9, 2016

(65) Prior Publication Data
US 2017/0307449 A1 Oct. 26, 2017

Related U.S. Application Data

(60) Provisional application No. 62/086,302, filed on Dec. 2, 2014.

(51) Int. Cl.
*H01F 21/08* (2006.01)
*G01K 7/36* (2006.01)
(Continued)

(52) U.S. Cl.
CPC .............. *G01K 7/36* (2013.01); *G01K 1/024* (2013.01); *G01K 1/08* (2013.01); *G01K 1/14* (2013.01);
(Continued)

(58) Field of Classification Search
CPC .. G01K 3/04; G01K 7/02; G01K 1/08; G01K 1/14; G01K 7/36; G01K 7/38;
(Continued)

(56) References Cited

U.S. PATENT DOCUMENTS 2,561,495 A * 7/1951 Harvey ................... H01F 17/04
29/608
2,869,087 A * 1/1959 Sontheimer ............. H01F 21/08
336/110
(Continued)

FOREIGN PATENT DOCUMENTS

CN 202134460 2/2012
CN 102 494 787 6/2013
(Continued)

OTHER PUBLICATIONS

Ajishi, "Preparation and Evaluation of Temperature-Sensitive Magnetic Film with Low Curie Temperature," Electrical Engineering in Japan, vol. 129, No. 4, 1999, pp. 158-163.
(Continued)

*Primary Examiner* — Gail Kaplan Verbitsky
(74) *Attorney, Agent, or Firm* — Yufeng Dong

(57) ABSTRACT

Systems and methods for sensing, measuring, or monitoring the temperature of an electrical transmission line of an electrical cable, are provided. A temperature sensitive inductor is disposed in thermal contact with the electrical transmission line. The temperature of the electrical transmission line can be sensed, measured, or monitored by measuring the inductance of the temperature sensitive inductor. Mechanisms and methods to eliminate, minimize, or account for the magnetic coupling between the current carried by the electrical transmission line and the temperature sensitive inductor are provided.

19 Claims, 13 Drawing Sheets

(51) Int. Cl.
*G01K 1/14* (2006.01)
*G01K 1/08* (2006.01)
*G01K 7/38* (2006.01)
*H01F 27/40* (2006.01)
*H02J 13/00* (2006.01)
*G01K 1/02* (2006.01)

(52) U.S. Cl.
CPC ............ *G01K 7/38* (2013.01); *H01F 27/402* (2013.01); *H02J 13/0075* (2013.01); *H01F 2027/406* (2013.01)

(58) Field of Classification Search
CPC .... H01F 17/04; H01F 21/08; H01F 2027/406; H01F 27/402
USPC ........................................................ 324/200
See application file for complete search history.

(56) References Cited

U.S. PATENT DOCUMENTS

| | | | |
|---|---|---|---|
| 2,999,214 | A | 9/1961 | Bradmiller |
| 4,459,576 | A | 7/1984 | Fox et al. |
| 4,537,517 | A * | 8/1985 | Inomata .................. C22C 45/04 307/117 |
| 4,703,296 | A | 10/1987 | Katoh |
| 5,775,810 | A | 7/1998 | Shin |
| 6,388,255 | B1 | 5/2002 | Di Maio et al. |
| 7,048,756 | B2 * | 5/2006 | Eggers .................. A61B 18/04 374/E7.04 |
| 7,213,967 | B2 * | 5/2007 | Simunovic ............. G01K 1/022 374/102 |
| 7,281,412 | B2 | 10/2007 | Olenick |
| 8,251,581 | B2 * | 8/2012 | Clothier .................. G01K 7/36 374/163 |
| 8,318,099 | B2 | 11/2012 | Potyrailo |
| 10,072,990 | B1 * | 9/2018 | Chang .................... G01R 33/00 |
| 2004/0122494 | A1 * | 6/2004 | Eggers .................. A61B 18/04 607/103 |
| 2008/0037298 | A1 | 2/2008 | Lafontaine |
| 2009/0102458 | A1 | 4/2009 | Ledieu |
| 2009/0146769 | A1 | 6/2009 | Feng et al. |
| 2012/0119576 | A1 | 5/2012 | Kesler |
| 2013/0096853 | A1 | 4/2013 | Mahalingam |
| 2016/0084051 | A1 * | 3/2016 | Vinegar .................. E21B 36/04 208/391 |
| 2018/0137961 | A1 * | 5/2018 | Nafradi .................... H01F 1/009 |

FOREIGN PATENT DOCUMENTS

| | | |
|---|---|---|
| CN | 102503389 | 4/2014 |
| CN | 102394198 | 3/2015 |
| EP | 2 472 240 A1 | 7/2012 |
| JP | 52-088795 | 7/1977 |
| JP | 58-074528 | 5/1983 |
| JP | 401206289 A * | 8/1989 |
| JP | 02-038319 | 2/1990 |
| JP | 05-066157 | 3/1993 |
| JP | 07-069718 | 3/1995 |
| JP | 08-145366 | 6/1996 |
| WO | WO 83/02841 A1 | 8/1983 |
| WO | WO 2008-008382 | 1/2008 |
| WO | WO 2014-176784 | 11/2014 |
| WO | WO 2015-035568 | 3/2015 |
| WO | WO 2015-047740 | 4/2015 |
| WO | WO 2016-065574 | 5/2016 |
| WO | WO 2016-106558 | 7/2016 |

OTHER PUBLICATIONS

Brito, "Evaluation of a Ni—Zn Ferrite for Use in Temperature Sensors," Progress in Electromagnetics Research Letters, vol. 13, 2010, pp. 103-112.
Miller, "The Temperature Sensing Reed Switch", Proc. 21$^{st}$ Annual National Relay Conference, May 1973, 8 pages.
Murakami, "The Characteristics of Ferrite Cores with Low Curie Temperature and their Application," IEEE Transactions on Magnetics, Jun. 1965, pp. 96-100.
Naoe, "Synthesis and Characterization of Temperature Sensitive Li—Zn—Cu Ferrite," Japanese Journal of Applied Physics, vol. 47, No. 1, 2008, pp. 550-553.
Seki, "Use of a Temperature-Sensitive Ferrite for Temperature/Humidity Measurements, IEEE Transactions on Instrumentation and Measurement," vol. 37, No. 3, Sep. 1988, pp. 468-470.
International Search Report for PCT International Application No. PCT/US2015/059260, dated Jan. 28, 2016, 4 pages.
Tong Min-ming et al., *Sensor Principle and Detection Technique*, pp. 287-289.

* cited by examiner

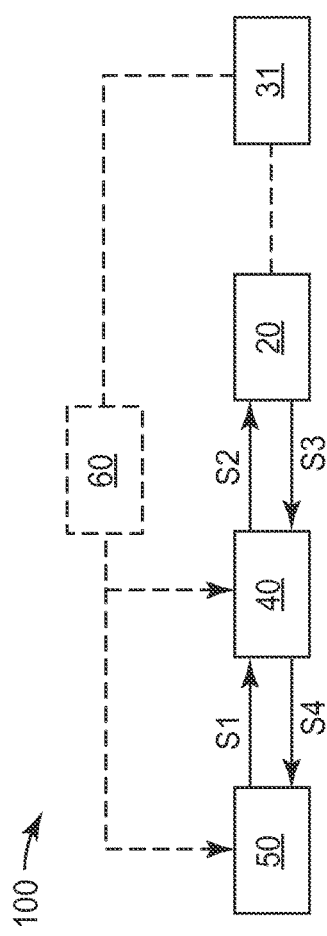
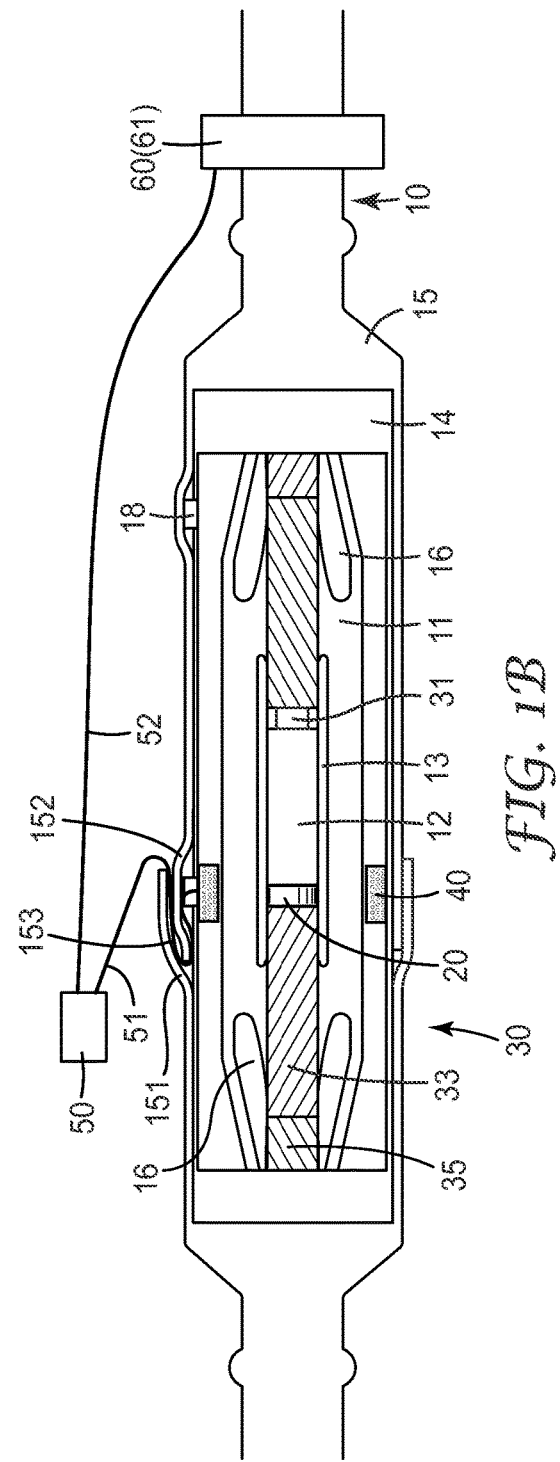
FIG. 1A
FIG. 1B

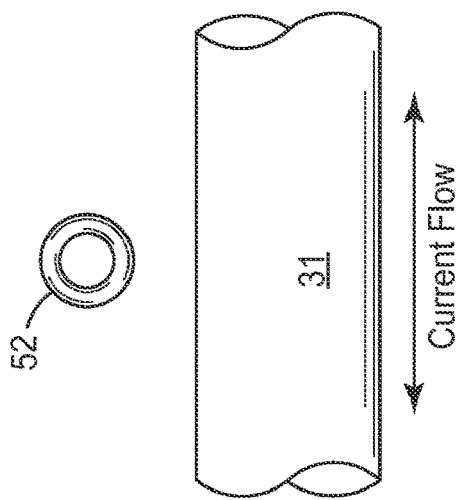
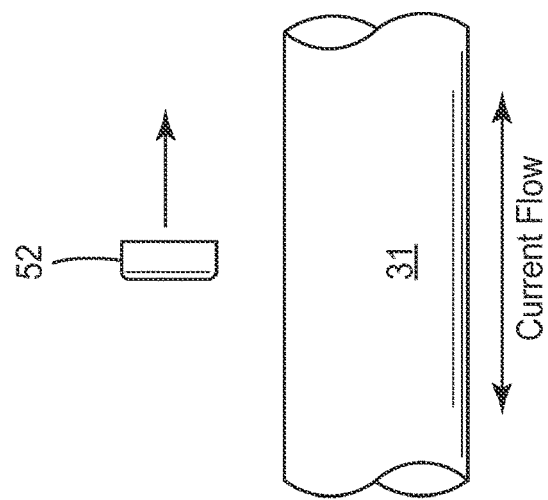
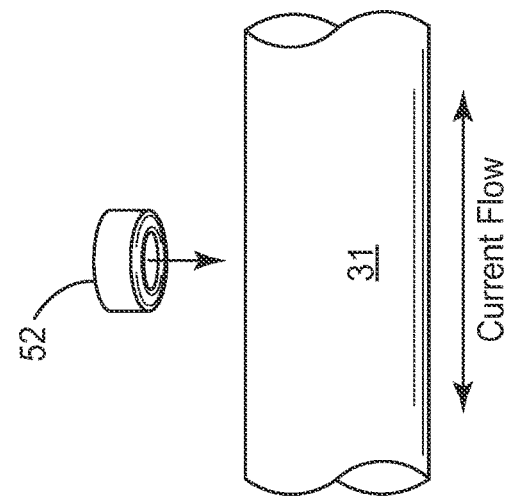

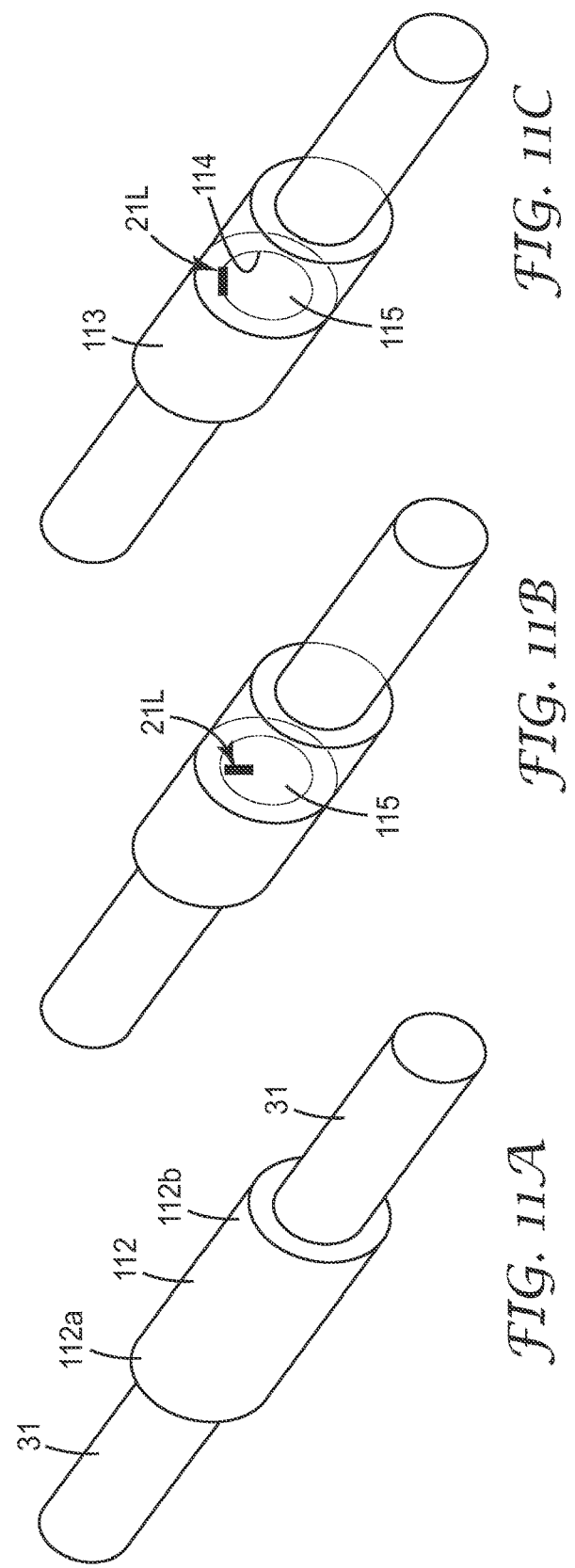

MAGNETIC BASED TEMPERATURE
SENSING FOR ELECTRICAL
TRANSMISSION LINE

CROSS REFERENCE TO RELATED APPLICATIONS

This application is a national stage filing under 35 U.S.C. 371 of PCT/US2015/059260, filed Nov. 5, 2015, which claims the benefit of U.S. Application No. 62/086,302, filed Dec. 2, 2014, the disclosure of which is incorporated by reference in its/their entirety herein.

TECHNICAL FIELD

The present disclosure relates to systems for monitoring temperature of an electrical conductor, and in particular, to systems for monitoring temperature of an electrical conductor, for example, an electrical conductor of an electrical power cable in a power distribution system.

BACKGROUND

Power distribution systems play an important role in modern society. Safety and security are always considerable factors for the "health" of power distribution systems. Accordingly, there should be a technology that enables monitoring of the "health" of the power distribution systems.

In a medium or high voltage power distribution system, the temperature of conductors of electrical cables may increase as currents carried by the cables increase. Accordingly, the "health" of such system can be assessed by monitoring the temperature of the on-line electrical conductor, for example, at the cable splices or the junctions, which may be the weak points, in such a system. Usually, normal currents flowing through the cable splices or the junctions may create a temperature of up to, for example, about 90° C. If the temperatures of the cable splices or the junctions were to increase beyond that, it could be an indication that something may be wrong in this power distribution system. On the other hand, it is also useful to know if the existing power distribution system is at maximum current carrying capacity, to know if additional power can be reliably distributed with the existing system, or, to know if additional infrastructure expenditures are needed.

SUMMARY

On-line power cables, as well as the cable splices and the junctions, in medium or high power distribution systems are typically insulated and protected by a number of insulative and (semi)conductive layers and/or are commonly buried underground or are high overhead. There is a desire to directly monitor or measure the temperature of the on-line electrical conductor in real-time.

Briefly, in one aspect, a temperature-sensing apparatus for sensing a temperature of an electrical transmission line is provided. The apparatus includes a passive circuit or unit that includes an inductor. The inductor has a temperature sensitive core. The temperature sensitive core has a composition with a relative magnetic permeability variable with temperature. The passive circuit has at least one of a resonance frequency or a Q value that varies with temperature. The temperature sensitive core is disposed in thermal contact with the electrical transmission line, and the inductance of the inductor varies with the temperature of the electrical transmission line. The term "thermal contact" used herein means that two or more articles can exchange energy with each other in the form of heat.

In another aspect, a method of sensing a temperature of an electrical transmission line is provided. The method includes providing a passive circuit that includes an inductor. The inductor includes a temperature sensitive core. The passive circuit has at least one of a resonance frequency or a Q value that varies with temperature. The temperature sensitive core is disposed in thermal contact with the electrical transmission line. A transceiver unit is provided to be electromagnetically coupled to the passive circuit. The method further includes measuring, via an electromagnetic coupling between the transceiver unit and the passive circuit, a resonant frequency of the passive circuit, and determining a change of the temperature of the electrical transmission line based on the measured resonant frequency. The temperature sensitive core has a composition with a relative magnetic permeability variable with temperature, and the inductance of the inductor and the resonant frequency of the passive circuit vary with the temperature of the electrical transmission line.

In another aspect, a method of monitoring a current within an electrical transmission line is provided. The method includes providing a passive circuit including an inductor, disposing the inductor in magnetic proximity to the electrical transmission line, providing a transceiver unit configured to be electromagnetically coupled to the passive circuit, monitoring, via an electromagnetic coupling between the transceiver unit and the passive circuit, a resonant frequency of the passive circuit, and determining a property such as phase or magnitude of the current within the electrical transmission line based on the monitored resonant frequency. The inductor includes an inductor core configured to be magnetically coupled to the magnetic flux generated by the current of the electrical transmission line, and the inductance of the inductor and the resonant frequency of the passive circuit vary with the current of the electrical transmission line.

Various unexpected results and advantages are obtained in exemplary embodiments of the disclosure. One such advantage of exemplary embodiments of the present disclosure is that the potential magnetic interference from the magnetic field of the electrical transmission line and/or the internal magnetic field of an inductor can be minimized. Without the magnetic interference, the temperature of the electrical transmission line can be accurately measured in real time based on the inductance change of the inductor upon the temperature change of the electrical transmission line.

LISTING OF EXEMPLARY EMBODIMENTS

Exemplary embodiments are listed below. It is to be understood that any of embodiments A to L, M to T, and U to W can be combined.

Embodiment A

A temperature-sensing apparatus for sensing a temperature of an electrical transmission line, the apparatus comprising:

a passive circuit comprising an inductor, the inductor including a temperature sensitive core having a composition with a relative magnetic permeability variable with temperature, the passive circuit having at least one of a resonance frequency or a Q value that varies with temperature; and a magnetic shielding structure disposed adjacent to the temperature sensitive core, and the magnetic shielding structure being configured to shield the temperature sensitive core from a magnetic field from the electrical transmission line when the temperature sensitive core is disposed in magnetic proximity to the electrical transmission line, wherein the temperature sensitive core is disposed in thermal contact with the electrical transmission line, and the inductance of the inductor varies with the temperature of the electrical transmission line.

Embodiment B

A temperature-sensing apparatus for sensing a temperature of an electrical transmission line, the apparatus comprising:

a passive circuit comprising an inductor, the inductor including a temperature sensitive core having a composition with a relative magnetic permeability variable with temperature, the passive circuit having at least one of a resonance frequency or a Q value that varies with temperature; and a hollow coupler for electrically connecting portions of the electrical transmission line in series, and the inductor being positioned in an inner space of the hollow coupler, wherein the temperature sensitive core is disposed in thermal contact with the electrical transmission line, and the inductance of the inductor varies with the temperature of the electrical transmission line.

Embodiment C

The apparatus of embodiment A or B, wherein the inductor is a toroidal inductor that includes the temperature sensitive core and an inductor coil, the temperature sensitive core has a ring-shape, and the inductor coil is distributed around the circumference of the temperature sensitive core.

Embodiment D

The apparatus of any one of the preceding embodiments, wherein the temperature sensitive core is disposed at a symmetric position in the magnetic field generated by the electrical transmission line.

Embodiment E

The apparatus of embodiment D, wherein the temperature sensitive core faces the electrical transmission line with a z-axis thereof extending substantially perpendicularly across the electrical transmission line.

Embodiment F

The apparatus of any one of the preceding embodiments, wherein the inductor includes a pot core inductor or a ferrite rod based inductor.

Embodiment G

The apparatus of embodiment A, wherein the magnetic shielding structure comprises a mu-metal, a nickel-iron alloy, or a combination thereof.

Embodiment H

The apparatus of any one of the preceding embodiment, wherein the composition of the temperature sensitive core comprises one or more ferromagnetic or ferrimagnetic materials having a Curie temperature above 150° C., and the composition exhibits a positive slope of the relative magnetic permeability versus temperature over the temperature range of from −50° C. to 150° C.

Embodiment I

The apparatus of any one of the preceding embodiments, wherein the composition of the temperature sensitive core comprises one or more ferromagnetic or ferrimagnetic materials having a Curie temperature below 150° C., and the composition exhibits a negative slope of the relative magnetic permeability versus temperature.

Embodiment J

The apparatus of any one of the preceding embodiments, further comprising a capacitor that is electrically connected to the inductor to form a passive resonance circuit.

Embodiment K

The apparatus of any one of the preceding embodiments, further comprising an antenna electrically connected with the inductor to form a passive resonance circuit.

Embodiment L

The apparatus of embodiment J or K, further comprising a transceiver unit electromagnetically coupled to the passive resonance circuit, and the transceiver unit being configured to send out a signal representing the temperature of the electrical transmission line.

Embodiment M

A method of sensing a temperature of an electrical transmission line, the method comprising:

providing a passive circuit having at least one of a resonance frequency and a Q value that varies with temperature, the passive circuit comprising an inductor including a temperature sensitive core;

disposing the temperature sensitive core in thermal contact with the electrical transmission line;

providing a transceiver unit configured to be electromagnetically coupled to the passive circuit;

measuring, via an electromagnetic coupling between the transceiver unit and the passive circuit, the resonant frequency or the Q value of the passive circuit; and determining the temperature of the electrical transmission line based on the measured resonant frequency or Q value, wherein the temperature sensitive core has a composition with a relative magnetic permeability variable with temperature, and the inductance of the inductor and the resonant frequency or the Q value of the passive circuit vary with the temperature of the electrical transmission line.

Embodiment N

The method of embodiment M, wherein the resonant frequency of the passive circuit is measured within a time window within which a current passing through the electrical transmission line is substantially zero.

Embodiment O

The method of embodiment N, further comprising determining a zero current crossing for the current within the electrical transmission line.

Embodiment P

The method of embodiment N or O, further comprising monitoring the resonant frequency or Q value of the passive circuit to determine at least one of a minimum resonant frequency and a maximum resonant frequency.

Embodiment Q

The method of any one of embodiments M to P, wherein the temperature sensitive core is disposed at a symmetric position in a magnetic field generated by the electrical transmission line to decrease a magnetic coupling between the magnetic field and the inductor.

Embodiment R

The method of any one of embodiment M to Q, further comprising providing a magnetic shielding structure disposed adjacent to the temperature sensitive core, and the magnetic shielding structure being configured to shield the temperature sensitive core from a magnetic field from the electrical transmission line when the temperature sensitive core is disposed in magnetic proximity to the electrical transmission line.

Embodiment S

The method of any one of embodiments M to R, further comprising disposing the temperature sensitive core inside a hollow coupler that electrically connects portions of the electrical transmission line in series.

Embodiment T

The method of any one of embodiments M to S, wherein the transceiver unit is configured to send out a signal representing the change of the temperature of the electrical transmission line.

Embodiment U

A method of monitoring a current within an electrical transmission line, the method comprising:
providing a passive circuit comprising an inductor,
disposing the inductor in magnetic proximity to the electrical transmission line;
providing a transceiver unit configured to be electromagnetically coupled to the passive circuit;
monitoring, via an electromagnetic coupling between the transceiver unit and the passive circuit, a resonant frequency or Q value of the passive circuit; and
determining a magnitude of the current within the electrical transmission line based on the monitored resonant frequency or Q value,
wherein the inductor includes an inductor core configured to be magnetically coupled to the magnetic flux generated by the current of the electrical transmission line, and the inductance of the inductor and the resonant frequency or Q value of the passive circuit vary with the current of the electrical transmission line.

Embodiment V

The method of embodiment U, wherein determining the magnitude of the current further comprises conducting a statistical analysis on the monitored resonant frequency.

Embodiment W

The method of embodiment U or V, further comprising determining a phase of the current within the electrical transmission line based on the monitored resonant frequency.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 1A is a schematic block diagram of a system for monitoring temperature of an electrical conductor, according to one embodiment.

FIG. 1B is a partial cut-away schematic view of application of a system for monitoring temperature of an electrical conductor in a cable splice assembly, according to one embodiment.

FIG. 9A is a schematic illustration of disposing a temperature sensitive inductor core in magnetic proximity to an electrical transmission line, according to one embodiment.

FIG. 9B is a schematic illustration of disposing a temperature sensitive inductor core in magnetic proximity to an electrical transmission line, according to another embodiment.

FIG. 9C is a schematic illustration of disposing a temperature sensitive inductor core in magnetic proximity to an electrical transmission line, according to another embodiment.

FIG. 11A illustrates a hollow coupler electrically connecting two sections of an electrical transmission line, according to one embodiment.

FIG. 11B illustrates a temperature sensitive inductor core located inside the hollow coupler of FIG. 11a, according to one embodiment.

FIG. 11C illustrates a temperature sensitive inductor core located inside the hollow coupler of FIG. 11a, according to another embodiment.

Figure 2A:
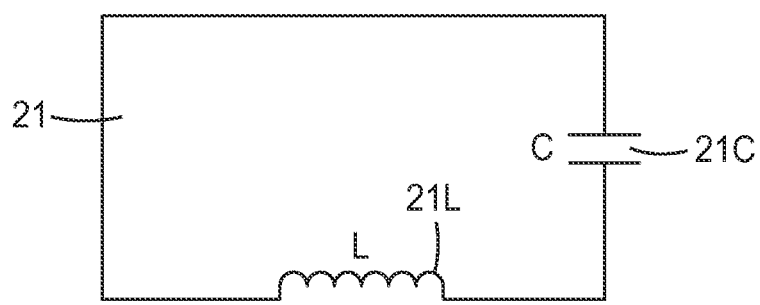
FIG. 2A is a schematic circuit diagram of an LC loop of a system for monitoring temperature of an electrical conductor, according to one embodiment.

In the drawings, like reference numerals indicate like elements. While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope of this disclosure.

DETAILED DESCRIPTION

The present disclosure describes systems and methods for directly sensing, measuring, or monitoring the temperature of an electrical conductor or electrical transmission line of a power cable in real time. The terms "electrical conductor" and "electrical transmission line" are used exchangeably in this disclosure. Some embodiments described herein provide temperature sensitive inductor that is in thermal contact with the electrical transmission line. The temperature sensitive inductor can include a temperature sensitive core that has a relative magnetic permeability variable with the temperature of the electrical transmission line. The temperature of the electrical transmission line can be sensed, measured, or monitored by measuring the inductance of the temperature sensitive inductor, which is a function of the relative magnetic permeability of the temperature sensitive core.

When current passes through an electrical transmission line, a magnetic field can be generated around the electrical transmission line. The magnetic flux or magnetic field lines can be in the form of, for example, concentric circles around the electrical transmission line that carries the current. When an inductor is disposed in magnetic proximity to the electrical transmission line, a magnetic coupling may be formed between the inductor and the magnetic flux generated by the electrical transmission line. The magnetic coupling may generate magnetic saturation in a magnetic inductor core of the inductor and may modify or change the inductance of the inductor. Some embodiments described herein provide methods and mechanisms to minimize, prevent, or account for potential magnetic saturation of the inductor in the presence of the magnetic field of the electrical transmission line.

The present disclosure provides embodiments of systems and methods for monitoring a temperature of an electrical conductor of, for example, medium or high voltage (e.g., >1 kV or >10 kV) power cables. It may be particularly useful to perform such monitoring by means of a "passive" apparatus, by which is meant an apparatus that does not require an internal power source (e.g., battery) and that does not need to be physically connected to an external power source. One type of passive apparatus that can find use in such applications relies on an LC circuit (i.e., an inductive-capacitive circuit). An appropriately designed LC circuit can exhibit a resonant frequency, which resonant frequency can be monitored (whether continuously or discontinuously) without necessarily requiring any wire connection to be made to the apparatus, as will be appreciated by the skilled person. When such an apparatus uses a temperature sensitive inductor that has a inductance sensitive to temperature, and the temperature sensitive inductor is placed in thermal communication or contact with a portion of an electrical conductor of a power cable, a change in temperature of that portion of the electrical conductor can cause the temperature of the temperature sensitive inductor to change commensurately. This temperature change can change the resonant frequency of the LC circuit, which can be detected and used to infer the temperature of that portion of the power cable.

FIG. 1 is a schematic diagram of a system 100 for monitoring a temperature of an electrical conductor 31 according to one embodiment. The system 100 includes a passive unit or circuit 20, a transceiver unit 40, and a control unit 50. The passive unit or circuit 20 is configured to include at least one temperature sensitive inductor as described hereinafter. The temperature sensitive inductor can include a magnetic inductor core that has a composition with a relative magnetic permeability variable with temperature. In some embodiments, the magnetic inductor core can be disposed in thermal contact with the electrical conductor 31. In some embodiments, the magnetic inductor core can be disposed in magnetic proximity to the electrical conductor 31.

In some embodiments, the passive unit or circuit 20 can have a resonant frequency and/or Q value that varies with the temperature of the electrical conductor 31. The transceiver unit 40 can be electromagnetically coupled to the passive unit or circuit 20, and send out a signal representing the resonant frequency and/or Q value of the passive unit or circuit 20. The control unit 50 can communicate with the transceiver unit 40 to ascertain the signal representing the resonant frequency and/or Q value, and to determine a value of the temperature of the electrical conductor 31 based on the ascertained signal representing the resonant frequency and/or Q value.

In some embodiments, during operation, if there is a need to monitor the temperature of the electrical conductor 31, the control unit 50 may send out an instruction signal S1 to the transceiver unit 40. Once the transceiver unit 40 receives the instruction signal S1, it then sends out an excitation signal S2 to the passive unit or circuit 20. The excitation signal S2 can induce the passive unit or circuit 20 to oscillate. The transceiver unit 40 can detect an oscillation signal S3 from the passive unit or circuit 20 and then send out a feedback signal S4 to the control unit 50. The oscillation signal S3 and the feedback signal S4 contain the information representing the resonant frequency and/or Q value of the passive unit or circuit 20, which can be varied with the temperature of the electrical conductor 31. The control unit 50 can determine a value of the temperature of the electrical conductor 31 based on the ascertained feedback signal S4.

In some embodiments, the system 100 may further include an optional energy harvesting unit 60. The energy harvesting unit 60 can be adapted to harvest electrical power from the electrical conductor 31 when an AC current flows through the electrical conductor 31 and to supply the harvested electrical power to the transceiver unit 40 and/or the control unit 50.

In one embodiment, the passive unit or circuit 20 can include an inductor-capacitor (LC) loop 21 as shown in FIG. 2A. The LC loop 21 includes a temperature sensitive inductor 21L and a capacitor 21C electrically connected in series, e.g. via a wire. The temperature sensitive inductor 21L exhibits an inductance that varies with temperature. In this instance, during practical application, the temperature sensitive inductor 21L can be in thermal contact or in direct contact with the electrical conductor 31 of FIG. 1. It is to be understood that in some embodiments the passive unit or circuit 20 may not include a capacitor that is separate from the temperature sensitive inductor 21L and the temperature sensitive inductor 21L alone may have a resonance frequency and/or a Q value.

Figure 2B:
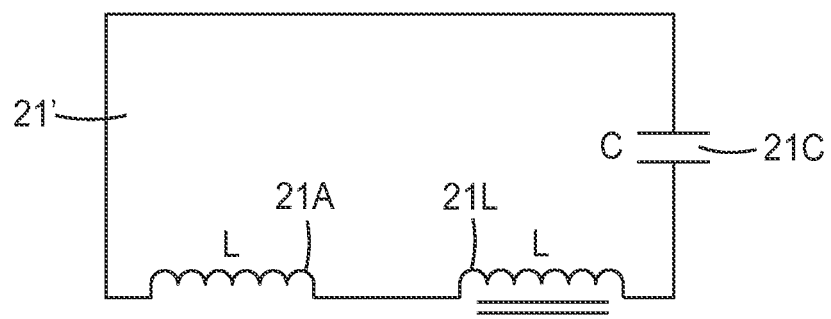
FIG. 2B is a schematic circuit diagram of an LC loop of a system for monitoring temperature of an electrical conductor, according to another embodiment.

In another embodiment, the passive unit or circuit 20 can include an inductor-capacitor (LC) loop 21' as shown in FIG. 2B. The LC loop 21' includes the temperature sensitive inductor 21L, an antenna 21A and the capacitor 21C electrically connected via wires. The temperature sensitive inductor 21L exhibits an inductance that varies with temperature. In this instance, during practical application, the temperature sensitive inductor 21L can be in thermal contact or in direct contact with the electrical conductor 31 of FIG. 1. The antenna 21A can be any suitable type of inductors such as, for example, a printed antenna, an inductive coil, etc. It can be understood that the LC loop 21 or 21' may include one or more capacitors and/or one or more inductors. The one or more capacitors and one or more inductors can be appropriately connected to form a LC loop.

The resonant frequency $f_r$ of a LC loop such as the LC loop 21 can be calculated according to equation (1) given as below:

$$f_r = \frac{1}{2\pi\sqrt{LC}} \quad (1)$$

in which L denotes a value of inductance, e.g. the inductance of the temperature sensitive inductor 21L; and C denotes a value of capacitance, e.g. the capacitance of the capacitor 21C.

In actuality, the LC loop 21 may have some resistive, dissipative, and/or absorptive loss, which can be modeled as a single small series resistance, Rs. The Q value of such an LC loop 21 can be calculated according to the formula (2) given below:

$$Q = \frac{\omega_0 L}{R_s} = \frac{1}{\omega_0 C R_s}, \quad (2)$$

where $\omega_0 = 2\pi f_r$, and where $f_r$ is the resonant frequency.

It can be seen that if the inductance or the capacitance of the LC loop 21 is changed, the resonant frequency $f_r$ and Q value can change accordingly. In the embodiments as shown in FIG. 2, as the inductor 21L is temperature sensitive and is configured to be in thermal contact with the electrical conductor 31. The temperature of the temperature sensitive inductor 21L can vary with the change in the temperature of the electrical conductor 31, thereby causing a change in the inductance of the inductor 21L. Consequently, the resonant frequency $f_r$ and the Q value of the LC loop 21 can vary with different temperature of the electrical conductor 31.

FIG. 1B illustrates application of the system 100 of FIG. 1 including the passive unit or circuit 20, the transceiver unit 40, and the control unit 50 for monitoring or measuring temperature of the electrical conductor 31, for example enclosed in a cable splice assembly 30, according to one embodiment.

In the cable splice assembly 30, two sections of an electrical cable 10 are spliced. Each section of the electrical cable 10 includes the electrical conductor 31, an insulation layer 33, and a (semi)conductive layer 35. The term "(semi) conductive" used herein indicates that the layer may be semi-conductive or conductive, depending on the particular construction. The insulation layer 33 and the (semi)conductive layer 35 enclose the electrical conductor 31. A connector 12 concentrically surrounds the spliced electrical conductors 31. A first (semi)conductive (or electrode) layer 13, in this case a metallic layer, concentrically surrounds the spliced electrical conductors 31 and the connector 12, forming a shielding Faraday cage around the connector 12 and the electrical conductors 31. In some embodiments, "(semi) conductive" indicates that the layer may be semi-conductive or conductive, depending on the particular construction. An insulating layer 11 (containing geometric stress control elements 16) surrounds the first (semi)conductive layer 13. The foregoing construction is placed inside a second (semi) conductive layer 14, in this case a metallic housing, which functions as a shield and ground layer. A resin can be poured into the metallic housing 14 through one of the ports 18 to fill in the area around insulating layer 11. A shrinkable sleeve layer 15 serves as an outermost layer.

In this embodiment, portions of the electrical conductors 31 are covered by the connector 12 and then are enclosed by the first (semi)conductive layer 13, the insulating layer 11, the second (semi)conductive layer 14, and the shrinkable sleeve layer 15. In this embodiment, the shrinkable sleeve layer 15 includes two overlapping sections 151 and 152 to leave a passage 153 between the overlapping portions. The passage 153 is from the outside of the shrinkable sleeve layer 15 through the port 18 on the second (semi)conductive layer 14 to the inside of the second (semi)conductive layer 14.

As shown in FIG. 1B, the passive unit or circuit 20 is positioned adjacent to one of the electrical conductors 31 and inside the first (semi)conductive layer 13. Preferably, a portion of the electrical conductor 31 is exposed between the insulation layer 33 of the electrical cable 10 and the connector 12, and the passive unit or circuit 20 may be positioned around the exposed portion of the electrical conductor 31.

The transceiver unit 40 is positioned outside the first (semi)conductive layer 13 and inside the second (semi)conductive layer 14, i.e. between the first (semi)conductive layer 13 and the second (semi)conductive layer 14. In one embodiment as shown FIG. 4, the transceiver unit 40 includes an inductor 44 that can include any type of inductor including, for example, an inductive coil, a printed antenna, etc. The inductor 44 can be positioned around the insulating layer 11 of FIG. 1B. In some embodiments, the inductor 44 and the inductor 21L of the passive unit or circuit 20 can be located in a same cross section, so as to improve the electromagnetic coupling. More detailed description about embodiments of the transceiver unit 40 will be provided hereinafter with reference to FIGS. 3A-B.

In some embodiments, a pairing of the passive unit or circuit 20 and the transceiver unit 40 can be located at a specific portion of the electrical cable 10 outside the assembly 30. The passive unit or circuit 20 can be disposed adjacent to the electrical conductor 31 and enclosed by the (semi)conductive layer 35 and the insulation layer 33 of the electrical cable 10. The transceiver unit 40 can be located outside the (semi)conductive layer 35 and configured to be electromagnetically coupled with the passive unit or circuit 20. A series of such pairings can be distributed along the electrical cable 10 to provide a temperature distribution of the electrical conductor 31.

Referring again to FIG. 1B, the control unit 50 is configured to communicate with the transceiver unit 40 through a wire 51. The wire 51 can be accommodated within the passage 153 so that the wire 51 can extend from the transceiver unit 40, through the port 18, to the control unit 50. The optional energy harvesting unit 60 including a power inductive coil 61 can be located outside the assembly 30 and around the cable 10, or located between the second (semi)conductive layer 14 and the shrinkable sleeve layer 15. The energy harvesting unit 60 can be used to supply power to the transceiver unit 40 and/or the control unit 50 through a wire 52. Throughout this specification, although the wire 51 and the wire 52 are each referred to as a "wire," it should be understood that either or both of wire 51 and wire 52 may include multiple wires as needed for the system to function.

In some embodiments, the inductive coil 61 of the optional energy harvesting unit 60 can include, for example, an iron-core current transformer, an air-core current transformer, or a Rogowski coil. The inductive coil 61 can be positioned outside the first (semi)conductive layer 13, or outside the second (semi)conductive layer if one is used. Preferably, the energy harvesting unit 60 may be used mainly to provide the harvested electrical power to the transceiver unit 40, so the energy harvesting unit 60 can be positioned outside the layer in which the transceiver unit 40 is located. Thus, the energy harvesting unit 60 may be electrically connected with the transceiver unit 40 via one or more wires. In some embodiments, the energy harvesting unit 60 may further include an optional rectifier circuit to adapt the harvested electrical power right for the transceiver unit 40 and/or the control unit 50.

Figure 3A:
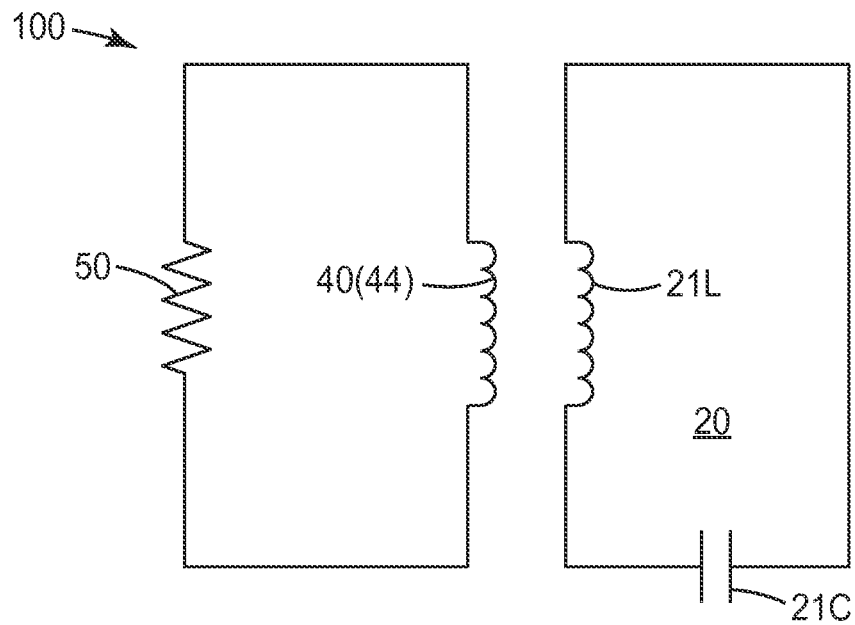
FIG. 3A is a schematic circuit diagram of a system for monitoring temperature of an electrical conductor, according to one embodiment.
Figure 3B:
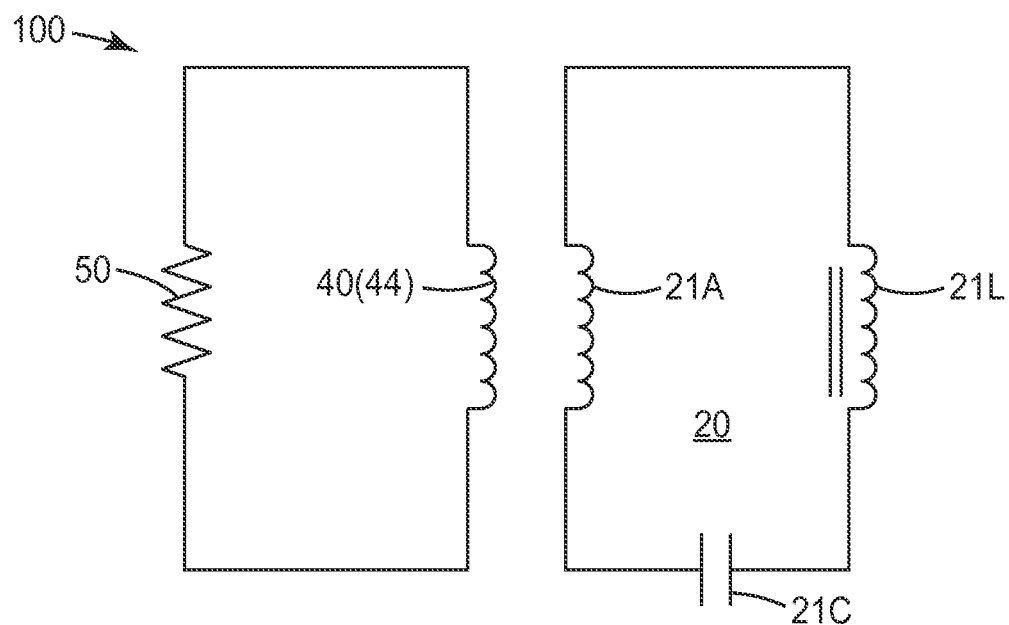
FIG. 3B is a schematic circuit diagram of a system for monitoring temperature of an electrical conductor, according to another embodiment.

In one embodiment as shown FIGS. 3A and 3B, the transceiver unit 40 includes an inductor 44 that can include any type of inductor such as, for example, an inductive coil, a printed antenna, etc. In FIG. 3A, the inductor 44 is electromagnetically coupled to the temperature sensitive inductor 21L of the passive unit or circuit 20. In FIG. 3A, the inductor 44 is electromagnetically coupled to the antenna 21A of the passive unit or circuit 20.

Figure 4:
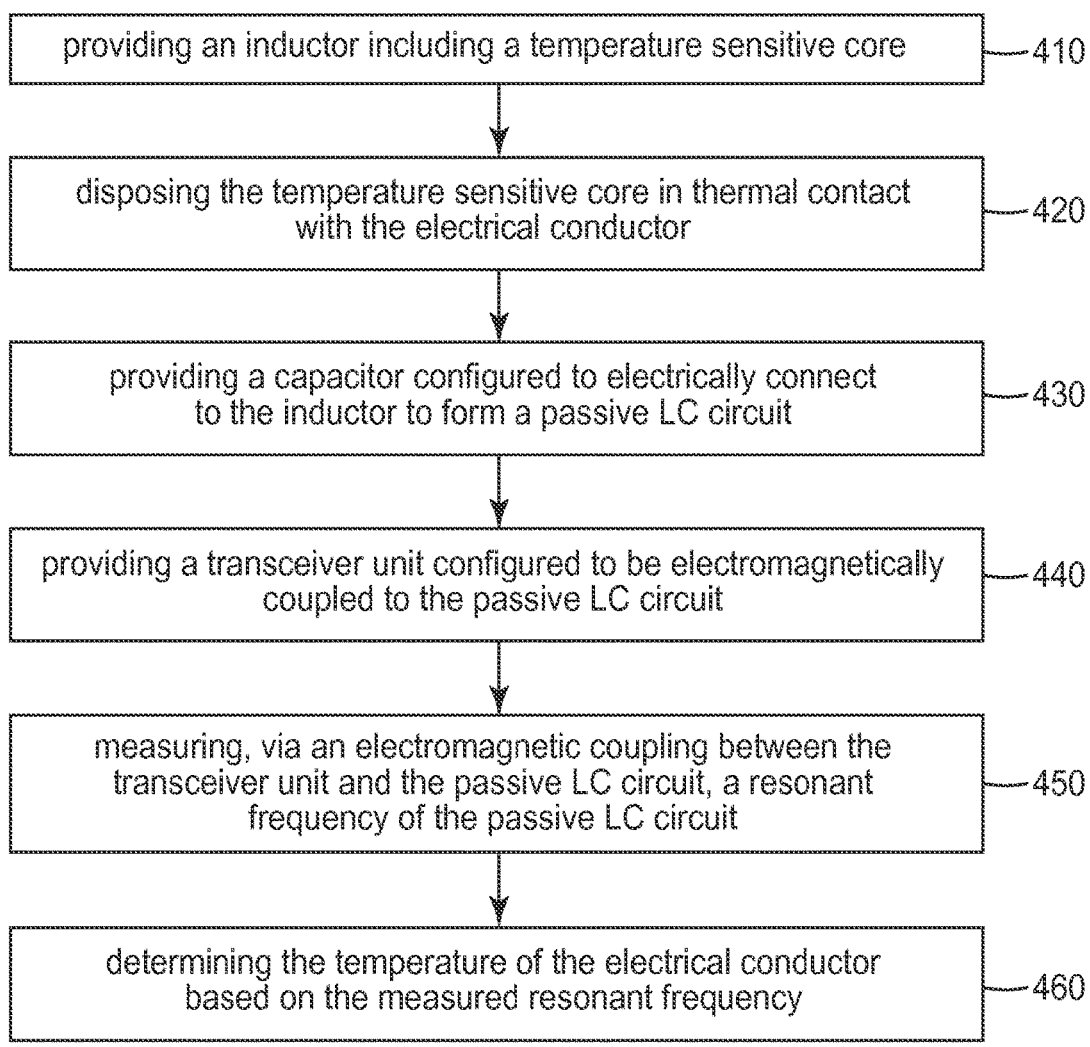
FIG. 4 is a schematic flow diagram of a method for monitoring temperature of an electrical conductor, according to one embodiment.

FIG. 4 is a flow diagram of a method 400 for sensing a temperature of an electrical conductor by using, for example, the system 100 of FIG. 1, according to one embodiment. At 410, an inductor including a temperature sensitive core is provided. The temperature sensitive core has a composition with a relative magnetic permeability that varies with temperature. In some embodiments, the temperature sensitive core can include a magnetic core. The magnetic core can include, for example, ferromagnetic or ferrimagnetic materials such as, for example, iron, silicone iron, carbonyl iron, ferrite, etc. The method 400 then proceeds to 420.

At 420, the temperature sensitive core is disposed in thermal contact with an electrical conductor such as the electrical conductor 31 of FIG. 1. In some embodiments, the temperature sensitive core can be in direct thermal contact with the electrical conductor 31. In some embodiments, a thermal-conductive material such as, for example, a thermal-conductive paste, can be disposed between the temperature sensitive core and the electrical conductor 31 to promote heat exchange between the temperature sensitive core and the electrical conductor 31. The method 400 then proceeds to 430.

At 430, a capacitor such as the capacitor 21C of FIG. 2A is provided to be electrically connected to the inductor to form a passive LC circuit such as the LC circuit 21 of FIG. 2A. The method 400 then proceeds to 440.

At 440, a transceiver unit such as the transceiver unit 40 of FIG. 1 is provided to be electromagnetically coupled to the passive LC circuit. The methods 400 then proceeds to 450.

At 450, the resonant frequency of the passive LC is measured, via the electromagnetic coupling between the transceiver unit 40 and the passive LC circuit, by the control unit 50. The method 400 then proceeds to 460.

At 460, the temperature of the electrical conductor 31 is determined based on the measured resonant frequency. In some embodiments, the absolute temperature of the electrical conductor 31 can be determined by the control unit 50 based on the measured resonant frequency. In some embodiments, a temperature change of the electrical conductor 31 can be determined by the control unit 50 based on the measured resonant frequency and the absolute temperature of the electrical conductor 31 can be determined accordingly.

Figure 5A:
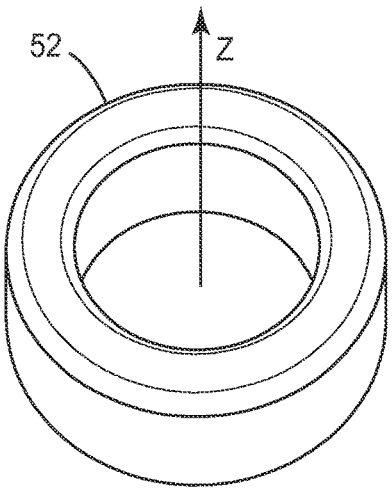
FIG. 5A is a perspective side view of a toroidal inductor, according to one embodiment.
Figure 5B:
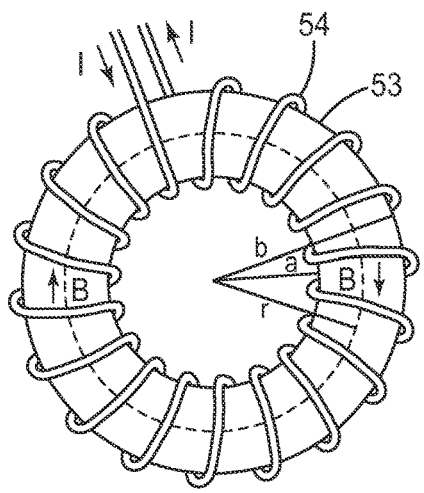
FIG. 5B is a schematic illustration of a magnetic field within the toroidal inductor of FIG. 5A that carries a current.

The temperature sensitive inductor 21L of FIGS. 2A-2B can be any type of inductors. In one embodiment, the temperature sensitive inductor 21L can be a toroidal inductor such as toroidal inductor 52 shown in FIGS. 5a and 5b. The toroidal inductor 52 includes a magnetic inductor core 53 and a winding 54 that is coiled around the magnetic inductor core 53. In some embodiments, the magnetic inductor core 53 can have a composition containing one or more ferromagnetic or ferrimagnetic materials such as, for example, iron, silicone iron, carbonyl iron, ferrite materials, etc. The ferrite materials can include, for example, manganese-zinc ferrite, nickel-zinc ferrite, etc. Ferrite materials can be commercially available from, for example, Fair-Rite Products Corp., NY. In the embodiment of FIGS. 5a-b, the toroidal inductor 52 has a "doughnut" or "ring" shape around a z axis. The magnetic inductor core 53 forms a closed-loop core where the entire path of the magnetic field lines can be within the magnetic inductor core 53. It is to be understood that the inductor 21L can be any type of inductors that include a magnetic inductor core having a relative magnetic permeability variable with temperature.

The inductance (L) of an inductor, such as the toroidal inductor 52, depends on the relative magnetic permeability of the ferrite toroidal core according to $$L = \frac{NA\mu_r - \mu_0^2}{2\pi r} \quad (3)$$

where N is the number of coil turns, A is the cross-sectional area of the magnetic inductor core 53, $\mu_o$ is the magnetic permeability of a vacuum, $\mu_r$ is the relative magnetic permeability of the magnetic inductor core 53, and r is the average radius of the magnetic inductor core 53. Similar equations can be derived for various inductor geometries showing a proportional dependence of magnetic permeability to inductance.

The toroidal inductor 52 can provide a relatively higher inductance and thus higher Q factor than similarly constructed coils with a straight core such as solenoid coils. In addition, the toroidal shape allows the temperature sensitive inductor 21L to be placed close to the electrical conductor 31, while minimizing loss and required shielding materials. In addition to cost and complexity reduction associated with shielding materials, minimization of shielding materials allows closer proximity to the electrical conductor and improved thermal contact between the electrical conductor and the temperature sensitive inductor.

Figure 6A:
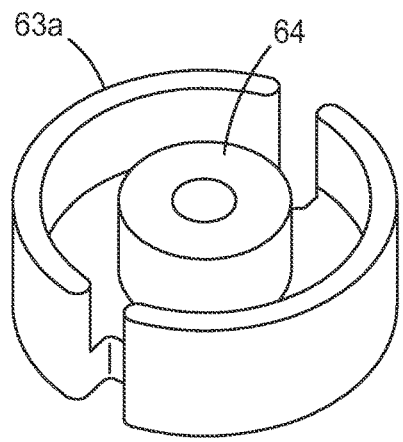
FIG. 6A is a perspective side view of a portion of a pot core inductor, according to one embodiment.
Figure 6B:
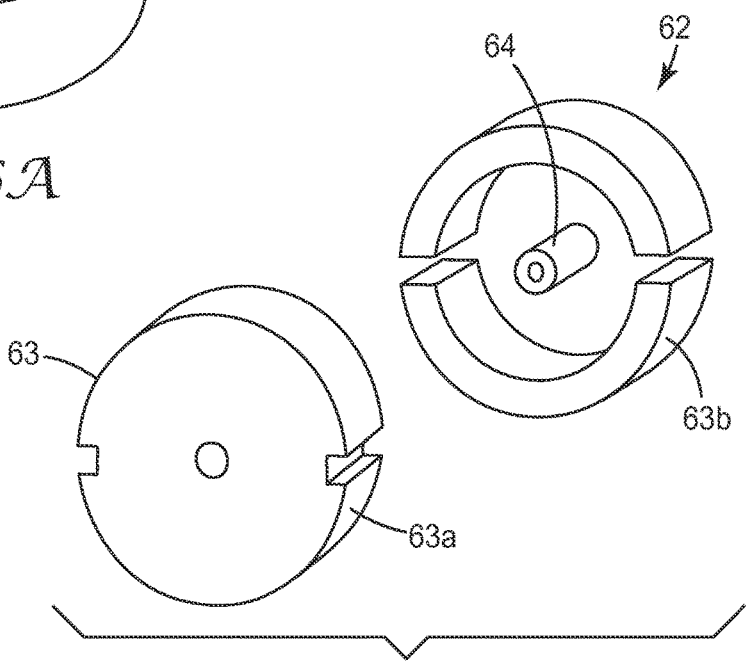
FIG. 6B is an explosive side view of a pot core inductor including the portion of FIG. 6A, according to one embodiment.

FIGS. 6A and 6B illustrate another type of the temperature sensitive inductor 21L. A pot core inductor 62 includes a ferromagnetic shell 63 that defines an internal hollow to enclose an inductor core 64 with a coil winding on a bobbin or a toroid. The ferromagnetic shell 63 can be made in two halves 63a and 63b which fit together. The inductor core 64 can contain one or more ferromagnetic or ferrimagnetic materials that are used for the magnetic inductor core 53 of FIG. 5B, and the inductor core 64 can exhibit similar temperature sensitivity in terms of relative magnetic permeability. The ferromagnetic shell 63 can provide a shielding effect, minimizing or eliminating magnetic saturation of the inductor core 64, and reducing possible electromagnetic interference.

In some embodiments, the temperature sensitive inductor 21L can be a ferrite rod based inductor that includes a ferrite rod and a coil mounted on the ferrite rod. In some embodiments, the ferrite rod can be disposed in parallel to an electrical conductor or transmission line.

Figure 7A:
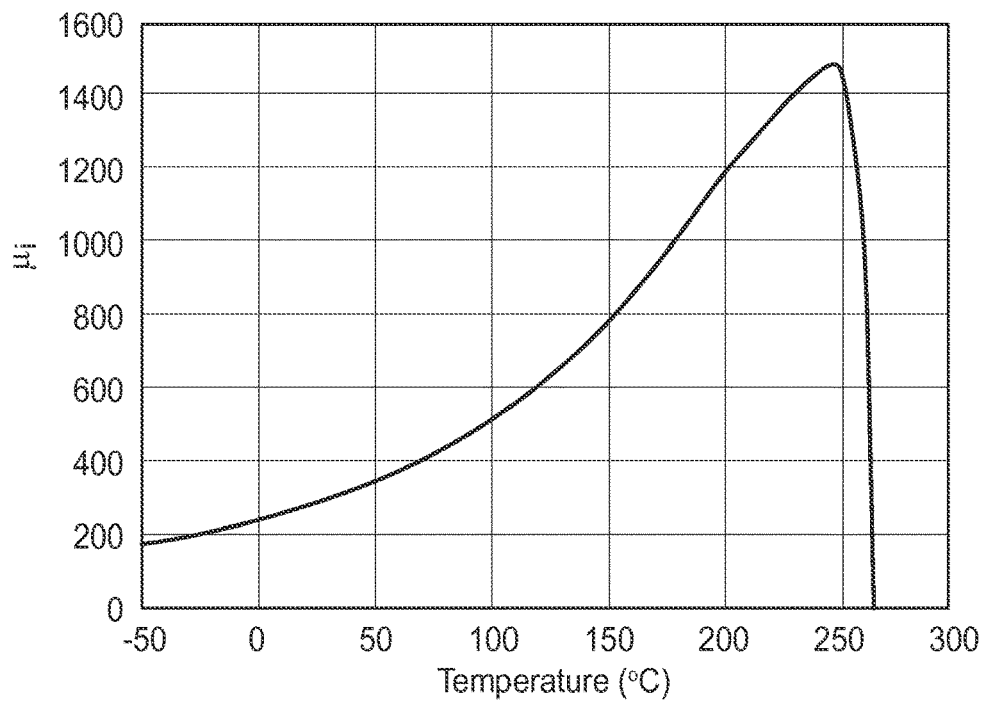
FIG. 7A is a graph showing the temperature sensitivity of the relative magnetic permeability of a magnetic inductor core, according to one embodiment.

A magnetic inductor core such as, for example, the magnetic inductor core 53 of FIGS. 5A-B, can include a ferromagnetic or ferrimagnetic material that exhibits a relatively high temperature coefficient of magnetic permeability ($\partial\mu_r/\partial T$). In some embodiments, the ferromagnetic or ferrimagnetic material can have a temperature coefficient of magnetic permeability with a magnitude of, for example, 0.5%/° C.$^{-1}$ or greater, 1%/° C.$^{-1}$ or greater, 2%/° C.$^{-1}$ or greater, 5%/° C.$^{-1}$ or greater, 10%/° C.$^{-1}$ or greater, 20%/° C.$^{-1}$ or greater, 40%/° C.$^{-1}$ or greater, or between 1%/° C.$^{-1}$ and 40%/° C.$^{-1}$, at a temperature between 0 and 130 degrees C. FIG. 7A shows temperature sensitivity of the relative magnetic permeability of a magnetic inductor core including ferrite materials manufactured by Fair-Rite Products Corp., NY, according to one embodiment. The relative magnetic permeability was measured at 100 kHz and published by Fair-Rite Products Corp., NY.

Figure 7B:
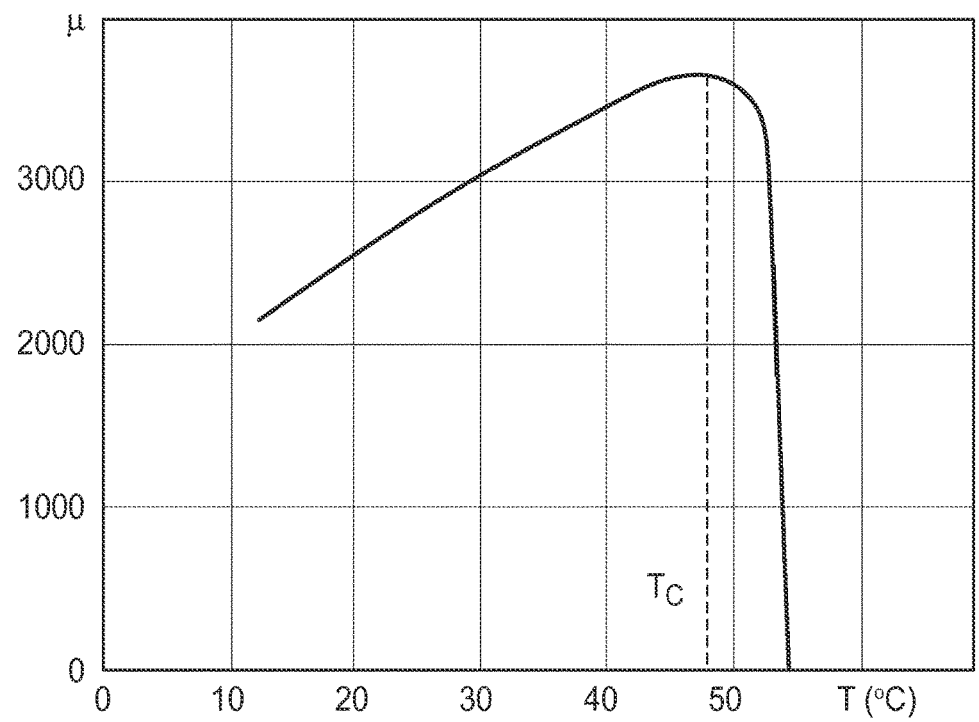
FIG. 7B illustrates temperature sensitivity of the relative magnetic permeability of an exemplary ferrite material, according to one embodiment.

In some embodiments, a magnetic inductor core such as, for example, the magnetic inductor core 53 of FIGS. 5A-B, can include a ferromagnetic or ferrimagnetic material that exhibits a Curie temperature of, for example, between 30° C. and 60° C. FIG. 7B shows temperature sensitivity of the relative magnetic permeability of an exemplary ferrite material, which was published in Murakami, K. "The characteristics of ferrite cores with low curie temperature and their applications", IEEE Transactions on Magnetics, June 1964. As shown in FIG. 7B, the relative magnetic permeability sharply decreases to a permeability of unity above the Curie temperature ($T_C$), which is caused by the transition from ferrimagnetic to paramagnetic.

In some embodiments, the inductance of the inductor 21L may vary upon the change of its geometry with changing temperature. In some embodiments, a magnetic inductor core of the inductor 21L may expand or contract with varying temperature upon the thermal contact with the electrical conductor 31. In some embodiments, the magnetic inductor core can have a volumetric coefficient of thermal expansion of, for example, between $5\times10^{-6}K^{-1}$ to $50\times10^{-6}K^{-1}$ at 20° C. The thermal expansion of the magnetic inductor core may induce a change D1 for the inductance of the inductor 21L. In some embodiments, the geometry, shape, and/or relative location of a winding around the magnetic inductor core may be changed with temperature, which may induce a change D2 for the inductance of the inductor 21L.

In some embodiments, the above inductance changes D1 and D2 can be much lower (e.g., one order of magnitude lower) than the inductance change induced by the change of relative magnetic permeability of the magnetic inductor core, and the inductance changes D1 and/or D2 can be negligible. In some embodiments, the above inductance changes D1 and/or D2 can be pre-calibrated and separable from the inductance change related to the change of relative magnetic permeability of the magnetic inductor core. After suitable pre-calibration, the inductance changes D1 and/or D2 can be used to determine the temperature of the electrical conductor 31, independently or in corporation with the inductance change related to the change of relative magnetic permeability with temperature.

Figure 8A:
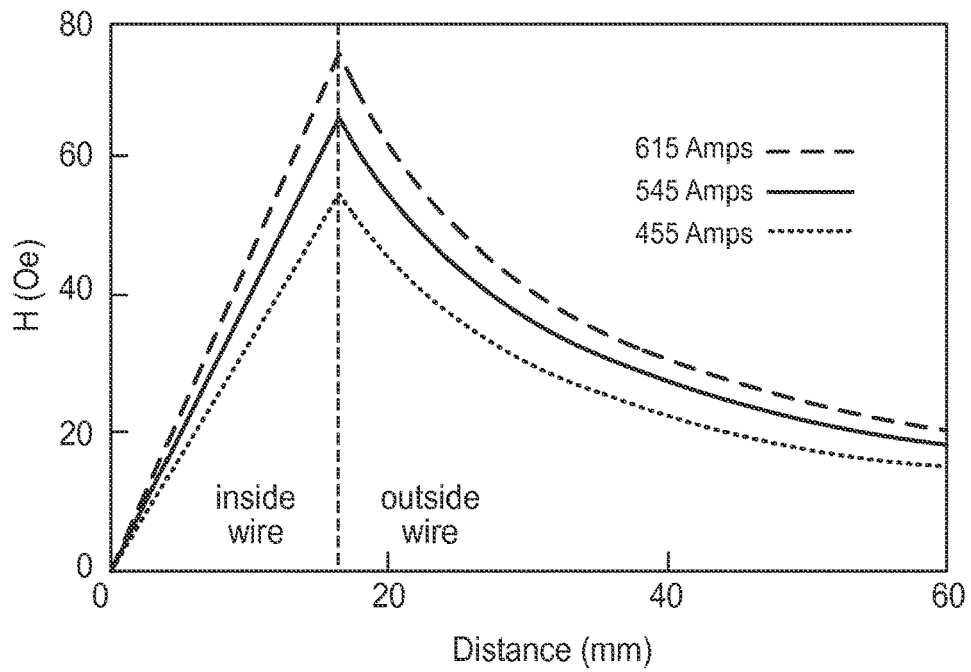
FIG. 8A is a graph showing a magnetic field as a function of distance from an electrical transmission line, according to equations 4 and 5.

As discussed above, a magnetic coupling may be formed between an electrical conductor or transmission line carrying a current and an inductor in magnetic proximity to the electrical conductor or transmission line. The term "magnetic proximity" used herein means that an inductor is disposed in a magnetic field generated from an electrical conductor or transmission line in the absence of, for example, a magnetic shielding structure that can shield the inductor from the magnetic field. The magnetic field strength (H) within and near a current carrying wire (e.g., the electrical conductor 31 of FIG. 1) can be given by equations (4) and (5) below (assuming a uniform current density within a current carrying wire having an infinite length):

$$\text{inside the wire: } H = \frac{Ir}{2\pi R^2} \quad (4)$$

$$\text{outside the wire: } H = \frac{I}{2\pi(R+d)} \quad (5)$$

where I is the current in the wire, r is the radial distance within the wire, R is the radius of the wire, and d is the radial distance from the outer surface of the wire. One exemplary calculation based on equations (4) and 5 is illustrated in FIG. 8A. In particular, FIG. 8A shows the magnitude of the magnetic field as a function of distance from a 1000 MCM electrical transmission line carrying a current of 455 A, 545 A and 615 A, which are the maximum current rating for a 1000 MCM transmission cable (radius=17 mm) at 60° C., 75° C., and 90° C., respectively.

Figure 8B:
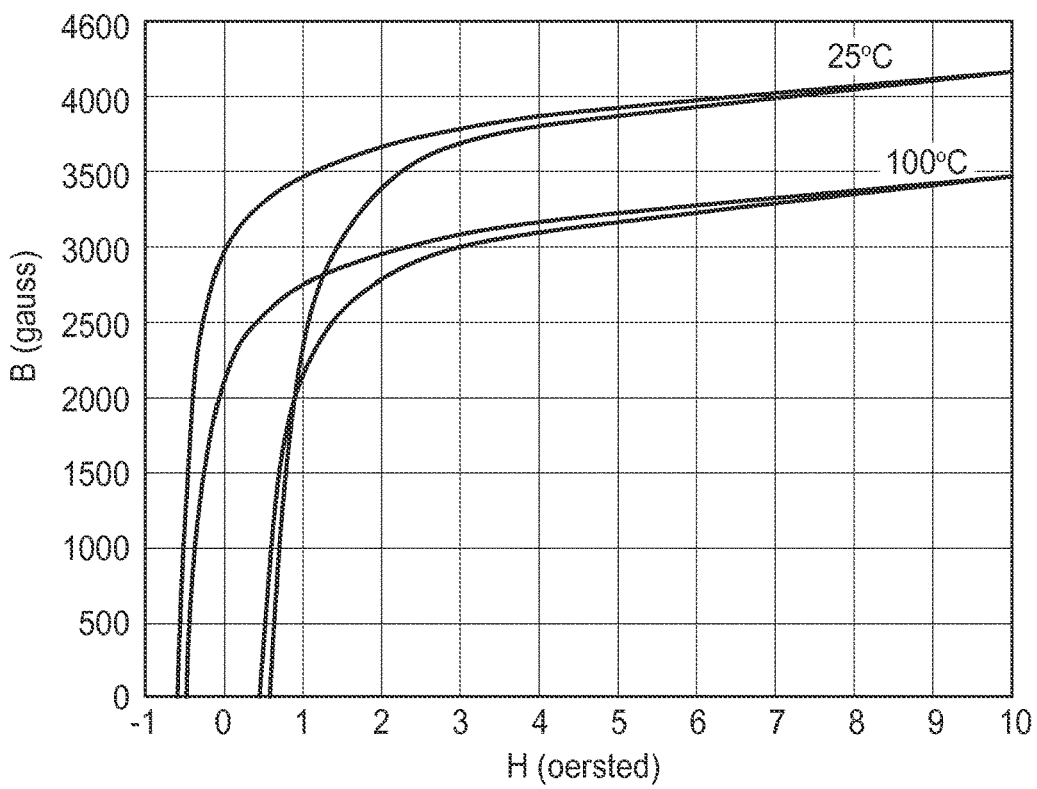
FIG. 8B is a graph showing a B-H curve for a ferrite material under the magnetic field of FIG. 8a, according to one embodiment.

A magnetic inductor core including a ferromagnetic or ferrimagnetic material can be disposed in magnetic proximity to an electrical transmission line carrying current. FIG. 8B shows the B-H curve for a magnetic inductor core containing a ferrite material from the Fair-Rite Products Corp., NY, according to one embodiment. The B-H curves of FIG. 8B were measured at 10 kHz and published by Fair-Rite Products Corp., NY. As shown in FIG. 8B, the magnetic inductor core can be magnetically saturated during the maximum current through the electrical transmission line due to the magnetic coupling between the inductor and the magnetic flux generated by the electrical transmission line. Saturation of the magnetic inductor core as induced by the presence of magnetic field from the electrical transmission line can decrease the inductance of the corresponding inductor, and thus increase the resonant frequency of the corresponding LC circuit such as the LC circuit 21 of FIG. 2A.

The magnetic coupling can be controlled by, for example, adjusting the orientation and/or location of a magnetic inductor core of the inductor with respect to the electrical conductor 31. FIGS. 9A-C illustrate three different orientations/locations of the toroidal inductor 52 of FIG. 5A with respect to the electrical conductor 31 that carries a current. The current of the electrical conductor 31 generates magnetic flux or magnetic field lines in the form of, for example, concentric circles around the electrical conductor 31. In FIG. 9A, the toroidal inductor 52 is disposed in magnetic proximity to the electrical conductor 31, and the toroidal inductor 52 is oriented with the z axis thereof being tangent to the magnetic flux of the electrical conductor 31. The z axis is shown in FIGS. 9B-C as the arrows. In FIG. 9B, the toroidal inductor 52 is oriented with the z axis thereof being substantially parallel to the electrical conductor 31. In FIG. 9C, the toroidal inductor 52 is disposed at a symmetric position in the magnetic field generated by the electrical conductor 31 to decrease a magnetic coupling between the magnetic field and the inductor. The toroidal inductor 52 faces the electrical conductor 31 with the z-axis thereof extending substantially perpendicularly across the electrical conductor 31. The orientation/location shown in FIG. 9c can reduce the potential magnetic coupling the magnetic inductor core and the electrical conductor 31.

Figure 10A:
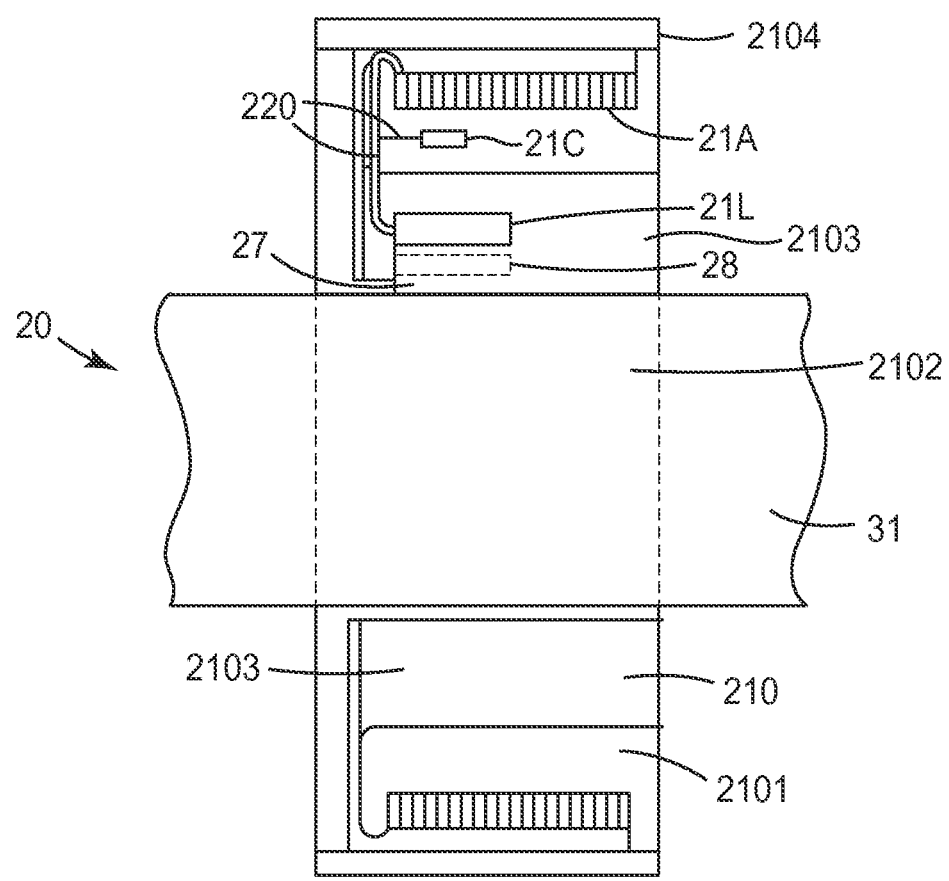
FIG. 10A is a sectional side view of an inductor for sensing the temperature of an electrical transmission line, according to one embodiment.
Figure 10B:
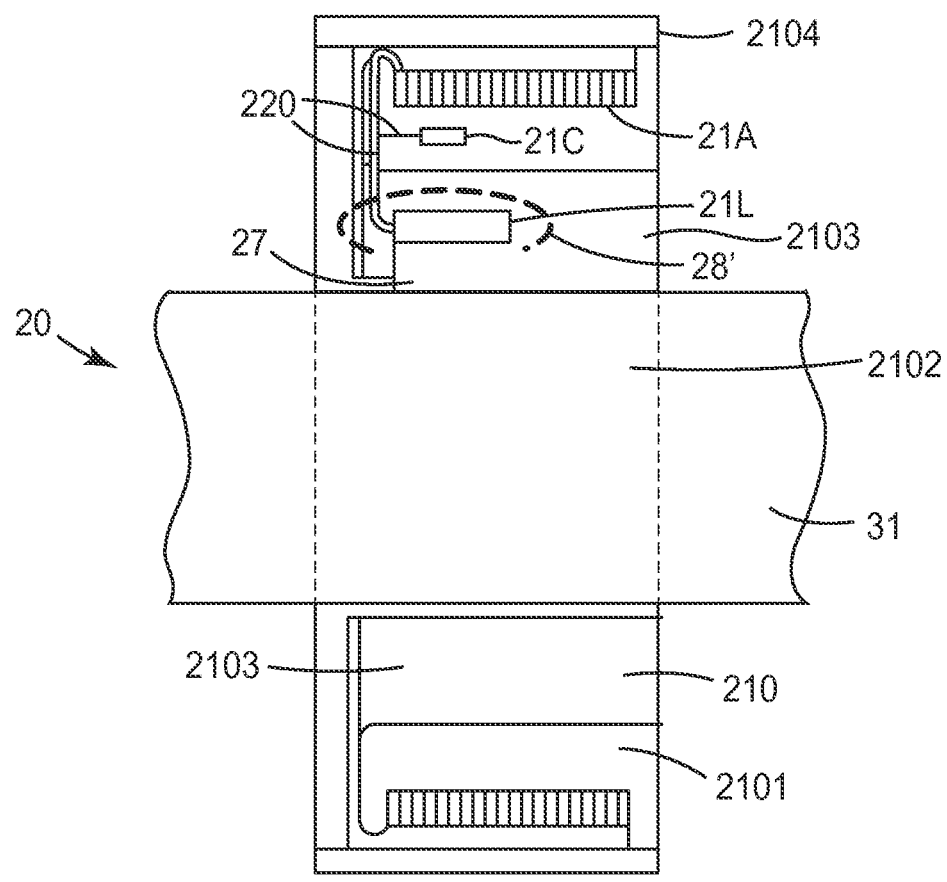
FIG. 10B is a sectional side view of an inductor for sensing the temperature of an electrical transmission line, according to another embodiment.

FIGS. 10A-B illustrate exemplary locations of the passive unit or circuit 20 of FIG. 1. As an example, the passive unit or circuit 20 includes the temperature sensitive inductor 21L, the antenna 21A, and the capacitor 21C, as shown in FIG. 2B. The temperature sensitive inductor 21L, the antenna 21A, and the capacitor 21C are electrically connected via wires 220 to form a LC loop. A fixture 210 is provided to install the passive unit or circuit 20. In the embodiment of FIGS. 10A-B, the fixture 210 includes a main body 2101 and a channel 2102. The channel 2102 is adapted to accommodate the electrical conductor 31 to have the conductor 31 pass through the channel 2102. The main body 2101 has a chamber 2103 to accommodate the temperature sensitive inductor 21L. The chamber 2103 can communicate with the channel 2102 in a way that the temperature sensitive inductor 21L can be in thermal contact with the electrical conductor 31 in operation. The capacitor 21C is supported by the main body 2101. The fixture 210 further includes a cover 2104 to enclose the main body 2101.

In the embodiment shown in FIGS. 10A-B, a thermal-conductive paste 27 is disposed to physically connect the temperature sensitive inductor 21L to the electrical conductor 31 so that the temperature sensitive inductor 21L is in thermal contact with the electrical conductor 31. It is to be understood that any suitable thermal-conductive means can be used to thermally connect the temperature sensitive inductor 21L to the electrical conductor 31.

As shown in FIGS. 10A-B, the passive unit or circuit 20 further includes an optional magnetic shielding structure 28 or 28' disposed adjacent to the temperature sensitive inductor 21L. In the embodiment of FIG. 10A, the magnetic shielding structure 28 is disposed between the temperature sensitive inductor 21L and the electrical conductor 31. In the embodiment of FIG. 10B, the magnetic shielding structure 28' has a bowl-shape to receive the temperature sensitive inductor 21L and is disposed to face the electrical conductor 31.

A magnetic shielding structure such as, for example, the magnetic shielding structure 28 or 28', can include one or more magnetic shielding materials to reduce or eliminate the incident magnetic field from the electrical conductor 31. The magnetic shielding structure can include, for example, one or more layers of mu-metal, nickel-iron alloy, a combination or mixture thereof, etc. In some embodiments, the magnetic shielding structure can be disposed to surround the temperature sensitive inductor 21L. In some embodiments, the magnetic shielding structure can be disposed to surround the electrical conductor 31. It is to be understood that the magnetic shielding structure 28 and 28' can be used together to shield the temperature sensitive inductor 21L from the magnetic field. It is to also be understood that more than one magnetic shielding structures such as, for example, the magnetic shielding structure 28 and 28' can be used in any suitable combinations.

In some embodiments, a magnetic shielding structure may be thermally conductive to promote heat exchange between the temperature sensitive inductor 21L and the electrical conductor 31. In some embodiments, an electrical insulative structure may be used to electrically isolate the magnetic shielding structure from the electrical conductor 31.

Due to the presence of the magnetic shielding structure, the magnetic flux originated from the electrical conductor 31 can be directed around the temperature sensitive inductor 21L without penetrating therethrough. The magnetic shielding structure may not significantly increase its temperature due to the absorption of the magnetic energy and may not act a heat source to change the temperature of the temperature sensitive inductor 21L. It is to be understood that any suitable magnetic shielding material can be used, and the magnetic shielding structure can have any suitable geometry as long as the magnetic field from the electrical conductor 31 can be effectively shielded from a magnetic inductor core. In some embodiments, the magnetic shielding structure can be thermal-conductive to promote heat exchange between the temperature sensitive inductor 21L and the electrical conductor 31.

In one embodiment, a magnetic shielding structure made of 2 mm thick layer of Mu-metal can be used to shield a magnetic inductor core, e.g., a wound inductor (Fair-Rite 5952020201 toroidal core with 84 windings), from a DC magnetic field of about 20 Oe. In the presence of the DC 20 Oe magnetic field, the inductance of the magnetic inductor core decrease from 533 µH to 10.5 µH, which represents saturation of the magnetic inductor core in the absence of the magnetic shielding structure. The presence of the 2 mm thick layer of Mu-metal can limit the inductance decrease to about 2% or less, which shows that a 2 mm thick Mu-metal shield may be sufficient to shield a DC 20 Oe magnetic field.

FIGS. 11A-C illustrate a spliced electrical conductor 31 where two sections of the electrical conductor 31 are electrically connected in series by a coupler 112. The coupler 112 has a hollow tubular shape with an outer surface 113 and an inner surface 114 defining an inner space 115 (not visible in FIG. 11A). The two sections of the electrical conductor 31 are inserted into the ends 112a and 112b of the coupler 112, respectively, and the current carried by the electrical conductor 31 can be transmitted through the coupler 112. In some embodiments, the temperature sensitive inductor 21L of FIG. 2 can be disposed in the inner space 115 of the coupler 112 where the magnetic field generated by the current can be close to zero.

In some embodiments, as shown in FIG. 11B, the temperature sensitive inductor 21L is located within the inner space 115 of the coupler 112. In some embodiments, the inner space 115 can be filled with one or more thermal-conductive materials, and the temperature sensitive inductor 21L can be embedded in the one or more thermal-conductive materials, which can enhance heat exchange between the temperature sensitive inductor 21L, the coupler 112, and the electrical conductor 31. In some embodiments, as shown in FIG. 11C, the temperature sensitive inductor 21L is disposed at the inner surface 114 of the coupler 112. In some embodiments, a thermal-conductive paste can be used to attach the temperature sensitive inductor 21L onto the inner surface 114 of the coupler 112.

Figure 12A:
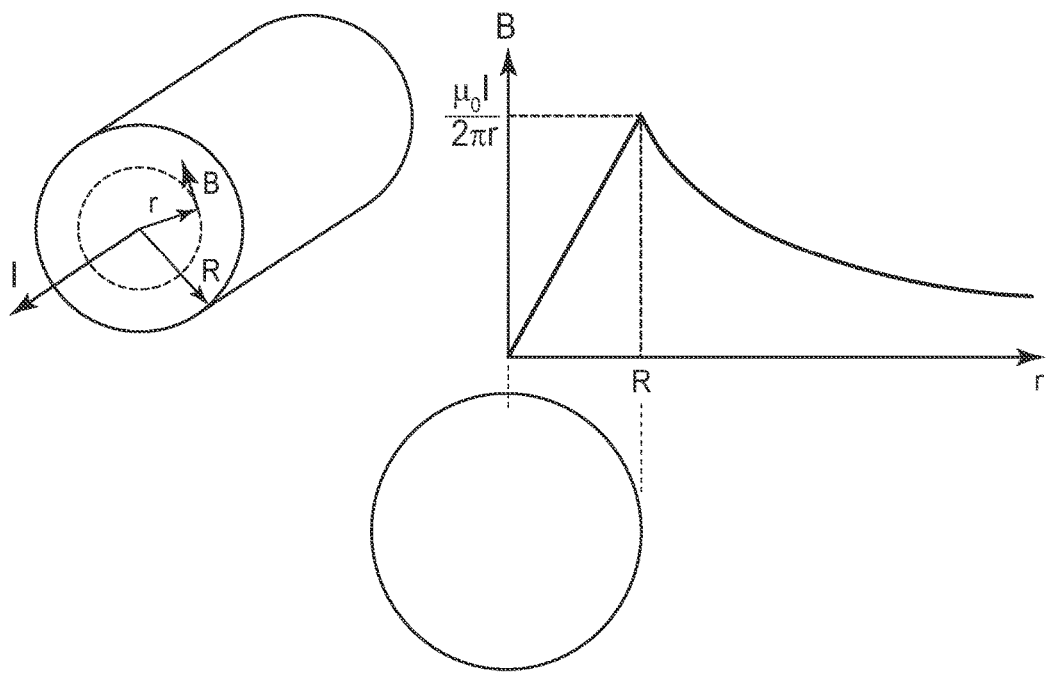
FIG. 12A is a schematic illustration of a magnetic field of a solid conductive wire carrying a current.
Figure 12B:
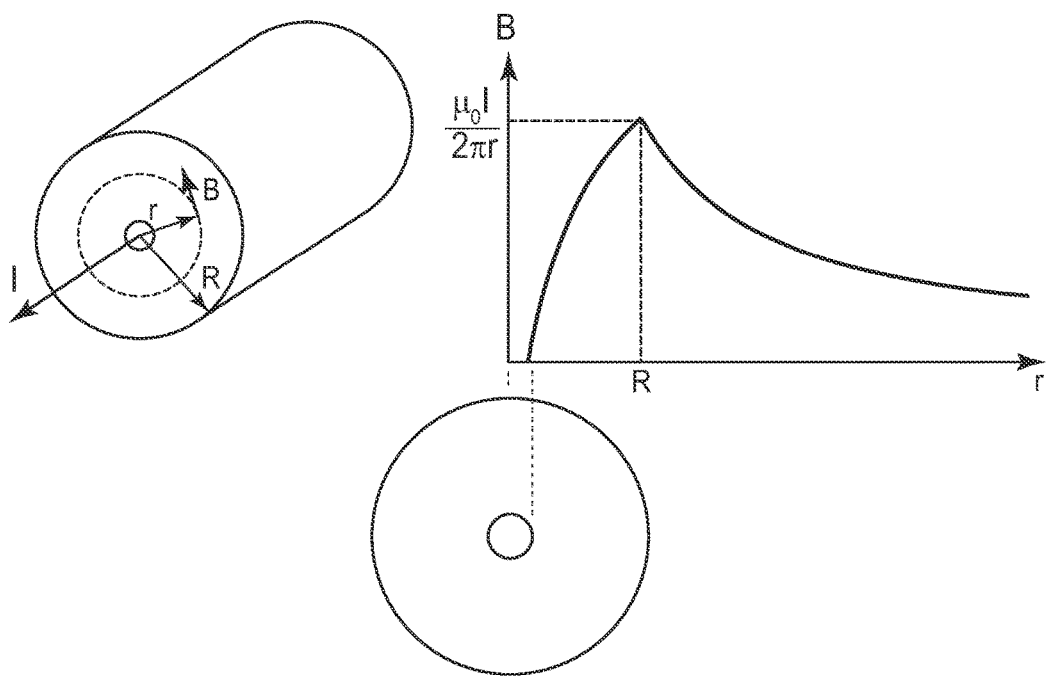
FIG. 12B is a schematic illustration of a magnetic field of a hollow conductive wire carrying a current.

For a hollow conductor such as the coupler 112, the current is transmitted through the hollow conductor, and the magnetic field within the inner space 115 can be close to zero. FIGS. 12a and 12b are schematic illustrations of magnetic field internal and external to a solid conductive wire carrying a current and a hollow conductive wire carrying a current, respectively. Placement of the temperature sensitive inductor 21L within the coupler 112, as shown in FIG. 11b, can eliminate saturation of the magnetic inductor core of the temperature sensitive inductor 21L as induced by the magnetic field of the electrical conductor 31. Placement of the temperature sensitive inductor 21L at the inner surface 114 of the coupler 112, as shown in FIG. 11c, can minimize the magnetic field onto the inductor core since the magnetic field is directly proportional to the current contained within the specified radius. It is to be understood that skin effect may not be reflected in the illustration of FIGS. 12A-B. When an AC current is passed through a solid or hollow conductor, the skin effect may concentrate the current and resultant magnetic field further towards an outside diameter of the conductor.

In some embodiments, the electromagnetic interference from the magnetic field of the electrical conductor 31 can be minimized by measuring the resonant frequency of an LC resonance circuit such as, for example, the LC circuit 21 of FIG. 2A, at zero current crossings of the electrical conductor 31. For example, for a 60 Hz frequency current carried by an electrical transmission line, the zero current crossing occurs at 120 Hz. At zero current crossings, the magnetic field from the electrical conductor 31 can be close to zero, and thus allows the magnetic inductor core of the inductor 21L to operate in the absence of an external magnetic field.

In some embodiments, if the phase of the current carried by the electrical conductor 31 is known or measured, the resonant frequency of the LC resonance circuit can be measured at or near the zero current crossings. In some embodiments, the resonant frequency of the LC circuit can be several orders of magnitude higher than the transmission frequency (e.g., 60 Hz) of the electrical conductor 31, which allows measurement time at or near the zero current crossings to be sufficient to determine the resonant frequency.

In some embodiment, if the phase of the current carried by the electrical conductor 31 is unknown or not measured, the resonant frequency of the LC circuit can be monitored to determine zero current crossings of the electrical conductor 31. The monitored minimum or maximum resonant frequency over a representative measurement time may correspond to the zero current crossings of the electrical conductor 31.

In some embodiment, the resonant frequency of the LC circuit can be monitored to determine the current carried by the electrical conductor 31. In one embodiment, the resonant frequency of the LC circuit can be continuously monitored for, for example, several to tens of seconds. In another embodiment, the resonant frequency of the LC circuit can be selectively monitored around the maximum or maximum magnitude of the current carried by the electrical conductor 31.

Figure 13:
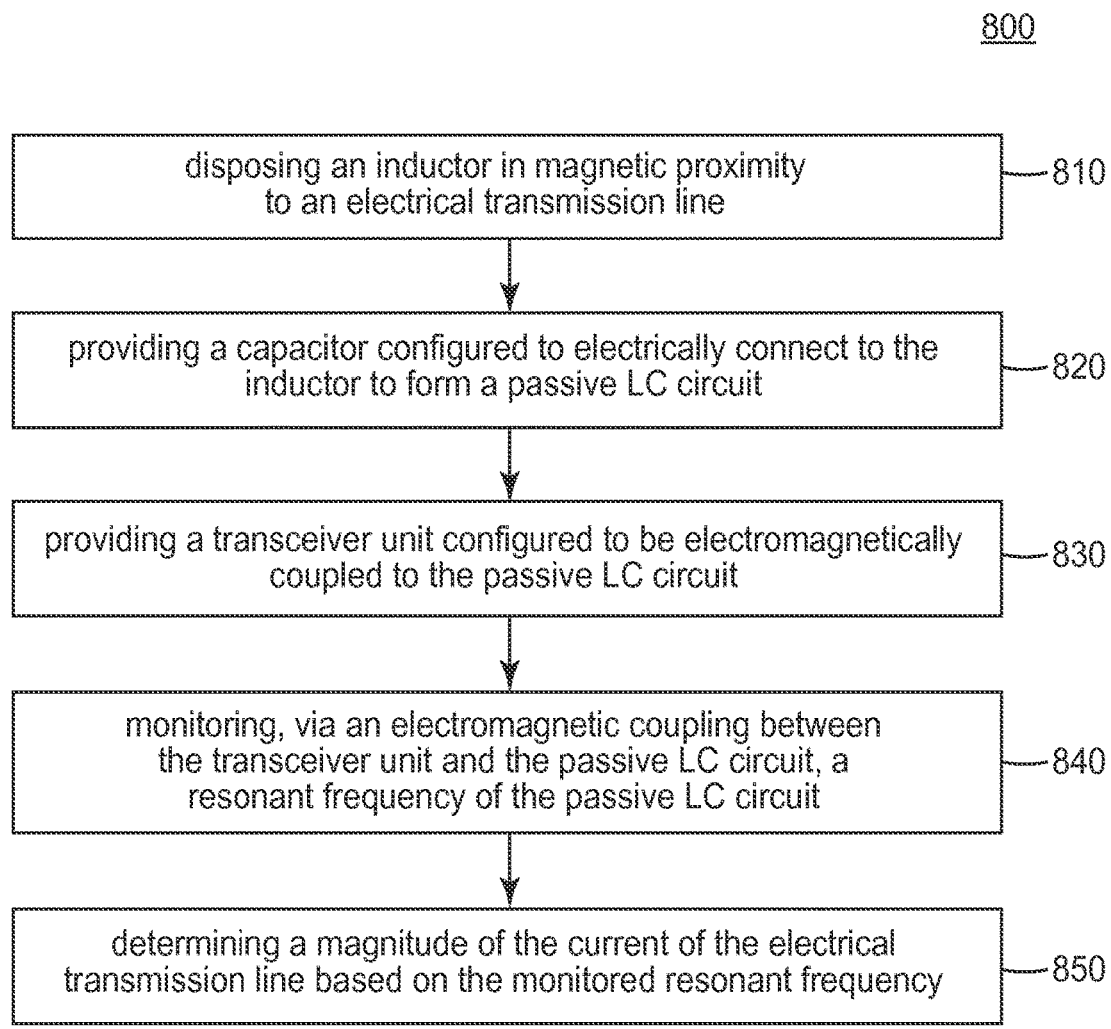
FIG. 13 is flow diagram of a method for monitoring a current within an electrical transmission line, according to one embodiment.

FIG. 13 is a flow diagram of a method 800 for monitoring a current within an electrical transmission line by using, for example, the system 100 of FIG. 1, according to one embodiment. At 810, an inductor such as the inductor 21L in the passive LC circuit 21 of FIG. 2a, is disposed in magnetic proximity to the electrical transmission line. The inductor includes a magnetic inductor core configured to be magnetically coupled to the magnetic flux generated by the current of the electrical transmission line, and the inductance of the inductor and the resonant frequency of the corresponding passive LC circuit (e.g., the LC circuit 21 of FIG. 2a) can vary with the current of the electrical transmission line. It is to be understood that the inductor may not be temperature sensitive and need not be in thermal contact with the electrical conductor 31. The method 800 then proceeds to 820.

At 820, a capacitor such as the capacitor 21C is configured to electrically connect to the inductor to form a passive LC circuit (e.g., the LC circuit 21). The method 800 then proceeds to 830.

At 830, a transceiver unit (e.g., the transceiver unit 40) is provided to be electromagnetically coupled to the passive LC circuit. The method 800 then proceeds to 840.

At 840, the resonant frequency of the passive LC circuit 21 is monitored, via an electromagnetic coupling between the transceiver unit and the passive LC circuit. In some embodiments, when the current of the electrical transmission line varies, the inductance of the inductor may be varied accordingly due to the reduced magnetic field and electromagnetic coupling therebetween, and the resonant frequency of the corresponding passive LC circuit (e.g., the LC circuit 21 of FIG. 2A) can vary accordingly. In some embodiments, the resonant frequency of the corresponding passive LC circuit can increase with increasing current of the electrical transmission line. In some embodiments, the resonant frequency of the corresponding passive LC circuit can decrease with increasing current of the electrical transmission line. The method 800 then proceeds to 850.

At 850, a magnitude of the current carried by the electrical transmission line is determined based on the monitored resonant frequency. In some embodiments, a statistical analysis can be conducted for the monitored resonant frequency of the passive LC circuit to determine properties (e.g., magnitude and phase) of the current. As discussed above, the monitored resonant frequency of the passive LC circuit 21 can reflect the properties (e.g., magnitude and phase) of the current of the electrical transmission line. The relationship between the properties of the current (e.g., magnitude, phase, etc.) and the resonant frequency of the passive LC circuit 21 can be determined by the statistical analysis.

Reference throughout this specification to "one embodiment," "certain embodiments," "one or more embodiments" or "an embodiment," whether or not including the term "exemplary" preceding the term "embodiment" means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A temperature-sensing apparatus for sensing a temperature of an electrical transmission line, the apparatus comprising:
a passive circuit comprising an inductor, the inductor including a temperature sensitive core having a composition with a relative magnetic permeability variable with temperature, the passive circuit having at least one of a resonance frequency or a Q value that varies with temperature;
a magnetic shielding structure disposed adjacent to the temperature sensitive core, and the magnetic shielding structure being configured to shield the temperature sensitive core from a magnetic field from the electrical transmission line when the temperature sensitive core is disposed in magnetic proximity to the electrical transmission line; and
a fixture comprising a chamber to accommodate the temperature sensitive core, and a channel to accommodate the electrical transmission line,
wherein the chamber and the channel communicate with each other such that the temperature sensitive core is disposed in thermal contact with the electrical transmission line, and
wherein the inductance of the inductor varies with the temperature of the electrical transmission line.

2. A temperature-sensing apparatus for sensing a temperature of an electrical transmission line, the apparatus comprising:
a passive circuit comprising an inductor, the inductor including a temperature sensitive core having a composition with a relative magnetic permeability variable with temperature, the passive circuit having at least one of a resonance frequency or a Q value that varies with temperature; and
a hollow coupler for electrically connecting portions of the electrical transmission line in series, and the inductor being positioned in an inner space of the hollow coupler,
wherein the temperature sensitive core is disposed in thermal contact with the electrical transmission line, and the inductance of the inductor varies with the temperature of the electrical transmission line.

3. The apparatus of claim 1, wherein the inductor is a toroidal inductor that includes the temperature sensitive core and an inductor coil, the temperature sensitive core has a ring-shape, and the inductor coil is distributed around the circumference of the temperature sensitive core.

4. The apparatus of claim 1, wherein the temperature sensitive core is disposed at a symmetric position in the magnetic field generated by the electrical transmission line.

5. The apparatus of claim 4, wherein the temperature sensitive core faces the electrical transmission line with a z-axis thereof extending substantially perpendicularly across the electrical transmission line.

6. The apparatus of claim 1, wherein the inductor includes a pot core inductor or a ferrite rod based inductor.

7. The apparatus of claim 1, wherein the magnetic shielding structure comprises a mu-metal, a nickel-iron alloy, or a combination thereof.

8. The apparatus of claim 1, wherein the composition of the temperature sensitive core comprises one or more ferromagnetic or ferrimagnetic materials having a Curie temperature above 150° C., and the composition exhibits a positive slope of the relative magnetic permeability versus temperature over the temperature range of from −50° C. to 150° C.

9. The apparatus of claim 1, wherein the composition of the temperature sensitive core comprises one or more ferromagnetic or ferrimagnetic materials having a Curie temperature below 150° C., and the composition exhibits a negative slope of the relative magnetic permeability versus temperature.

10. The apparatus of claim 1, wherein the passive circuit further comprises a capacitor that is electrically connected to the inductor.

11. The apparatus of claim 1, wherein the passive circuit further comprises an antenna electrically connected with the inductor.

12. The apparatus of claim 1, further comprising a transceiver unit electromagnetically coupled to the passive circuit, and the transceiver unit being configured to send out a signal representing the temperature of the electrical transmission line.

13. A method of sensing a temperature of an electrical transmission line, the method comprising:
- providing a passive circuit having at least one of a resonance frequency and a Q value that varies with temperature, the passive circuit comprising an inductor including a temperature sensitive core;
- disposing the temperature sensitive core in thermal contact with the electrical transmission line, further comprising disposing the temperature sensitive core inside a hollow coupler that electrically connects portions of the electrical transmission line in series;
- providing a transceiver unit configured to be electromagnetically coupled to the passive circuit;
- measuring, via an electromagnetic coupling between the transceiver unit and the passive circuit, the resonant frequency or the Q value of the passive circuit; and
- determining the temperature of the electrical transmission line based on the measured resonant frequency or Q value,
- wherein the temperature sensitive core has a composition with a relative magnetic permeability variable with temperature, and the inductance of the inductor and the resonant frequency or the Q value of the passive circuit vary with the temperature of the electrical transmission line.

14. The method of claim 13, wherein the resonant frequency of the passive circuit is measured within a time window within which a current passing through the electrical transmission line is substantially zero.

15. The method of claim 14, further comprising determining a zero current crossing for the current within the electrical transmission line.

16. The method of claim 15, further comprising monitoring the resonant frequency or Q value of the passive circuit to determine at least one of a minimum resonant frequency and a maximum resonant frequency.

17. The method of claim 13, wherein the temperature sensitive core is disposed at a symmetric position in a magnetic field generated by the electrical transmission line to decrease a magnetic coupling between the magnetic field and the inductor.

18. The method of claim 13, further comprising providing a magnetic shielding structure disposed adjacent to the temperature sensitive core, and the magnetic shielding structure being configured to shield the temperature sensitive core from a magnetic field from the electrical transmission line when the temperature sensitive core is disposed in magnetic proximity to the electrical transmission line.

19. The method of claim 13, wherein the transceiver unit is configured to send out a signal representing the temperature of the electrical transmission line.

\* \* \* \* \*